(12) United States Patent
Droppo et al.

(10) Patent No.: US 7,266,494 B2
(45) Date of Patent: Sep. 4, 2007

(54) METHOD AND APPARATUS FOR IDENTIFYING NOISE ENVIRONMENTS FROM NOISY SIGNALS

(75) Inventors: James G. Droppo, Duvall, WA (US); Alejandro Acero, Bellevue, WA (US); Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 10/985,896

(22) Filed: Nov. 10, 2004

(65) Prior Publication Data

US 2005/0071157 A1    Mar. 31, 2005

Related U.S. Application Data

(62) Division of application No. 09/965,239, filed on Sep. 27, 2001, now Pat. No. 6,959,276.

(51) Int. Cl.
*G10L 21/02* (2006.01)

(52) U.S. Cl. .............. 704/228; 704/226; 704/231; 704/240

(58) Field of Classification Search .......... 704/231, 704/226–228, 230, 232, 233, 222, 251, 256, 704/240–246
See application file for complete search history.

(56) References Cited

U.S. PATENT DOCUMENTS

| | | | |
|---|---|---|---|
| 5,604,839 A | 2/1997 | Acero et al. ........... 395/2.43 |
| 5,680,508 A * | 10/1997 | Liu ........................ 704/227 |
| 5,706,394 A | 1/1998 | Wynn ..................... 704/219 |
| 5,708,754 A | 1/1998 | Wynn ..................... 704/219 |
| 5,781,883 A | 7/1998 | Wynn ..................... 704/226 |
| 5,794,194 A | 8/1998 | Takebayashi et al. ...... 704/251 |
| 5,892,853 A | 4/1999 | Hirani et al. ............. 382/280 |
| 5,924,065 A * | 7/1999 | Eberman et al. ........... 704/231 |
| 6,009,391 A | 12/1999 | Asghar et al. ............ 704/243 |
| 6,067,517 A * | 5/2000 | Bahl et al. .............. 704/256.4 |
| 6,070,137 A | 5/2000 | Bloebaum et al. ......... 704/227 |

(Continued)

FOREIGN PATENT DOCUMENTS

DE    1 99 712 A2    10/2001

(Continued)

OTHER PUBLICATIONS

U.S. Appl. No. 09/688,764, filed Oct. 16, 2000, Li Deng.

(Continued)

*Primary Examiner*—Vijay Chawan
(74) *Attorney, Agent, or Firm*—Theodore M. Magee; Westman, Champlin & Kelly, P.A.

(57) ABSTRACT

A method and apparatus are provided for identifying a noise environment for a frame of an input signal based on at least one feature for that frame. To identify the noise environment, a probability for a noise environment is determined by applying the noisy input feature vector to a distribution of noisy training feature vectors. In one embodiment, each noisy training feature vector in the distribution is formed by modifying a set of clean training feature vectors. In one embodiment, the probabilities of the noise environments for past frames are included in the identification of an environment for a current frame. In one embodiment, a correction vector is then selected based on the identified noise environment.

43 Claims, 6 Drawing Sheets

U.S. PATENT DOCUMENTS

| | | | |
|---|---|---|---|
| 6,151,573 A * | 11/2000 | Gong | 704/256.2 |
| 6,163,608 A | 12/2000 | Romesburg et al. | 379/406.01 |
| 6,289,309 B1 | 9/2001 | deVries | 704/233 |
| 6,445,801 B1 | 9/2002 | Pastor et al. | 381/94.2 |
| 6,449,594 B1 * | 9/2002 | Hwang et al. | 704/233 |
| 6,711,536 B2 | 3/2004 | Rees | 704/210 |
| 2002/0082829 A1 | 6/2002 | Jiang et al. | 704/226 |
| 2004/0158465 A1 | 8/2004 | Rees | 704/223 |

FOREIGN PATENT DOCUMENTS

| | | |
|---|---|---|
| GB | WO9708684 A1 | 3/1997 |
| JP | 09-258768 | 10/1997 |
| JP | 2003/1777781 | 6/2003 |

OTHER PUBLICATIONS

U.S. Appl. No. 09/688,950, filed Oct. 16, 2000, Li Deng.

Anastasakos, T., et al., "A Compact Model for Speaker-Adaptive Training," BBN Systems and Technologies, pp. 1137-1140 (undated).

Boll, S. F., "Suppression of Acoustic Noise in Speech Using Spectral Subtraction," IEEE Transactions on Acoustics, Speech and Signal Processing, vol. ASSP-27, No. 2, pp. 113-120 (Apr. 1979).

Lockwood, P. et al., "Experiments With a Nonlinear Spectral Subtractor (NSS), Hidden Markov Models and the Projection, for Robust Speech Recognition in Cars," Speech Communication 11, pp. 215-228 (1992).

Boll, S. F., "A Spectral Subtraction Algorithm for Suppression of Acoustic Noise in Speech," IEEE International Conference on Acoustics, Speech & Signal Processing, pp. 200-203 (Apr. 2-4, 1979).

Berouti, M. et al., "Enhancement of Speech Corrupted by Acoustic Noise," IEEE International Conference on Acoustics, Speech & Signal Processing, pp. 208-211 (Apr. 2-4, 1979).

Acero, A., "Acoustical and Environmental Robustness in Automatic Speech Recognition," Department of Electrical and Computer Engineering, Carnegie Mellon University, pp. 1-141 (Sep. 13, 1990).

Moreno, P., "Speech Recognition in Noisy Environments," Department of Electrical and Computer Engineering, Carnegie Mellon University, pp. 1-130 (Apr. 22, 1996).

El-Maleh et al Jun. 1999, ("An Improved Background Noise Coding Mode for Variable Rate Speech Coders," Workshop on Speech Coding Proceedings, Jun. 1999).

El-Maleh et al Mar. 1999 ("Frame Level Noise Classification in Mobile Environments," International Conference on Acoustics, Speech and Signal Processing, Mar. 1999).

Thiemann et al ("Low Distortion Acoustic Noise Suppression Using A Perceptual Model for Speech Signals," IEEE Workshop Proceedings Speech Coding, Oct. 2002.

Berstein et al ("An Hypothesized Wiener Filtering Approach to Noisy Speech Recognition," International Conference on Acoustics, Speech and Signal Processing, May 1991).

Hansen et al ("Constrained Iterative Speech Enhancement With Application to Automatic Speech Recognition," International Conference on Acoustics, Speech, and Signal Processing, Apr. 1998).

Gurbuz et al ("Multi-Stream Product Modal Audio-Visual Integration Strategy for Robust Adaptive Speech Recognition," International Conference on Acoustics, Speech and Signal Processing, May 2002).

Freeman et al ("The Voice Activity Detector for the Pan-European Digital Cellular Mobile Telephone Service," International Conference on Acoustics, Speech and Signal Processing, May 1989).

Treurniet ("Noise Independent Speech Recognition For a Variety of Noise Types," International Conference on Acoustics, Speech and Signal Processing, Apr. 1994).

McAulay et al ("Speech Enhancement Using a Soft-Decision Noise Suppression Filter," IEEE Transactions on Acoustics, Speech and Signal Processing, Apr. 1980).

Office Action dated Oct. 22, 2004 from U.S. Appl. No. 09/965,239, filed Sep. 27, 2001.

* cited by examiner

METHOD AND APPARATUS FOR IDENTIFYING NOISE ENVIRONMENTS FROM NOISY SIGNALS

This application is a divisional of and claims priority from U.S. application Ser. No. 09/965,239, filed on Sep. 27, 2001 now U.S. Pat. No. 6,959,276.

BACKGROUND OF THE INVENTION

The present invention relates to noise in signals. In particular, the present invention relates to identifying noise environments from noisy signals used in pattern recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models.

Before a model can be used to decode an incoming signal, it must be trained. This is typically done by measuring input training signals generated from a known training pattern. For example, in speech recognition, a collection of speech signals is generated by speakers reading from a known text. These speech signals are then used to train the models.

In order for the models to work optimally, the signals used to train the model should be similar to the eventual test signals that are decoded. In particular, the training signals should have the same amount and type of noise as the test signals that are decoded.

Typically, the training signal is collected under "clean" conditions and is considered to be relatively noise free. To achieve this same low level of noise in the test signal, many prior art systems apply noise reduction techniques to the testing data.

One particular technique for removing noise under the prior art, identifies a set of correction vectors from a stereo signal formed of two channel signals, each channel containing the same pattern signal. One of the channel signals is "clean" and the other includes additive noise. Using feature vectors that represent frames of these channel signals, a collection of noise correction vectors are determined that map the feature vectors of the noisy channel signal to the feature vectors of the clean channel signal. When a feature vector of a noisy pattern signal, either a training signal or a test signal, is later received, a suitable correction vector is added to the feature vector to produce a noise reduced feature vector.

Under the prior art, such systems are either trained using data from a single noise environment, such as an office or a car, or by treating data from different environments as occurring in a single environment. Systems that are trained using data from only a single noise environment experience a drop in performance when they are used in a different noise environment. Thus, a system trained with car noise will not work as well in an airplane.

Systems that treat noise data from different environments as occurring in a single environment are not optimal because they tend to jump between noise correction vectors for different noise environments even when the noise environment in which the system is being used is not changing. Thus, such a system may switch between correction vectors associated with a car, a plane, and an office while it is being used in the single environment of a car.

Some speech recognition systems of the prior art have attempted to identify an environment for an entire utterance by selecting the environment from a group of possible environments. However, because these systems only identify the environment at utterance boundaries, they do not work well when the noise environment changes during an utterance. Thus, a system is needed that can identify a noise environment "on the fly" as each section of an utterance is processed instead of waiting for the entire utterance to be received.

SUMMARY OF THE INVENTION

A method and apparatus are provided for identifying a noise environment for a frame of an input signal based on at least one feature for that frame. To identify the noise environment, a probability for a noise environment is determined by applying the noisy input feature vector to a distribution of noisy training feature vectors. In one embodiment, each noisy training feature vector in the distribution is formed by modifying a set of clean training feature vectors. In one embodiment, the probabilities of the noise environments for past frames are included in the identification of an environment for a current frame. In one embodiment, a correction vector is then selected based on the identified noise environment.

DETAILED DESCRIPTION OF ILLUSTRATIVE EMBODIMENTS

Figure 1:
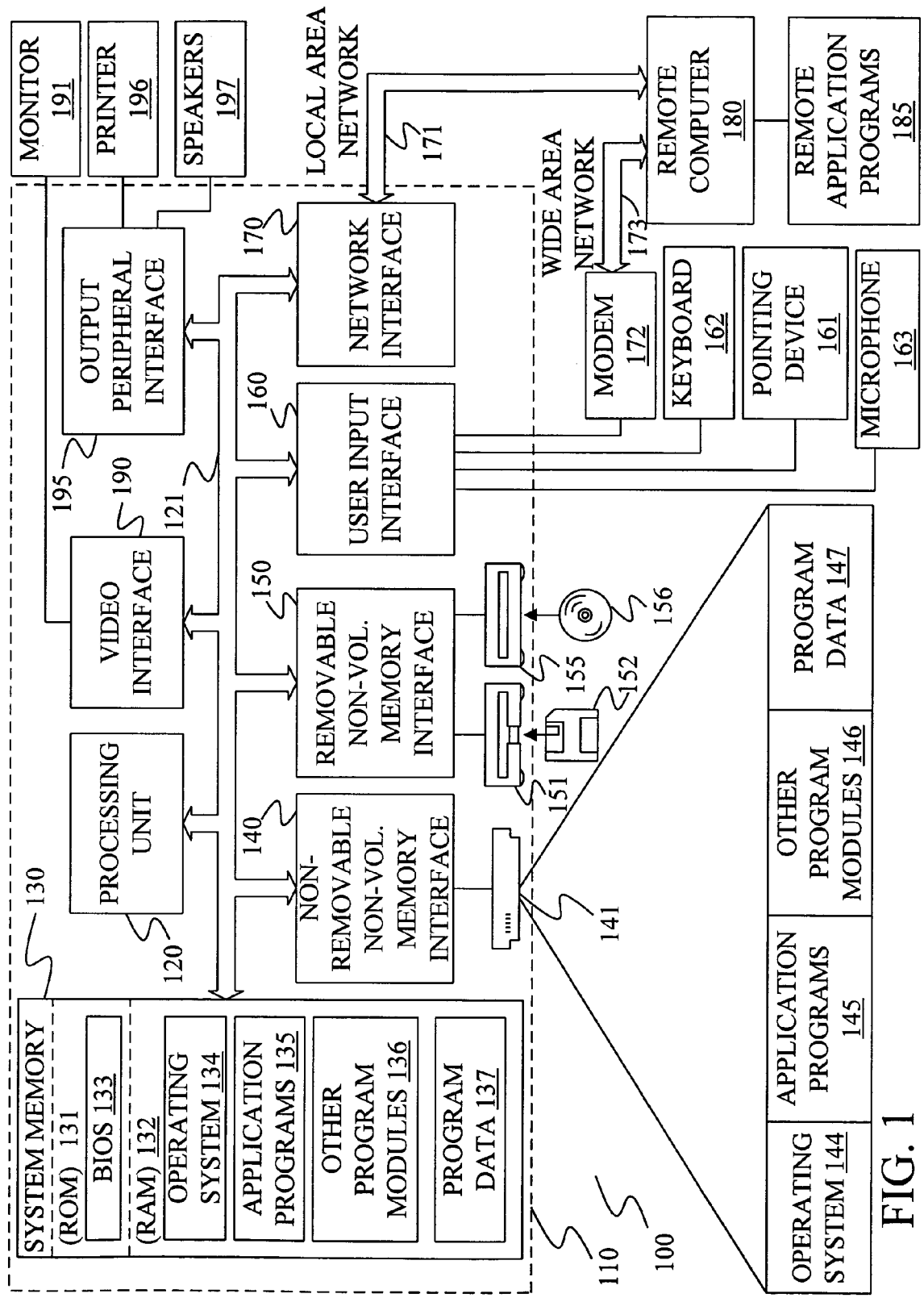
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
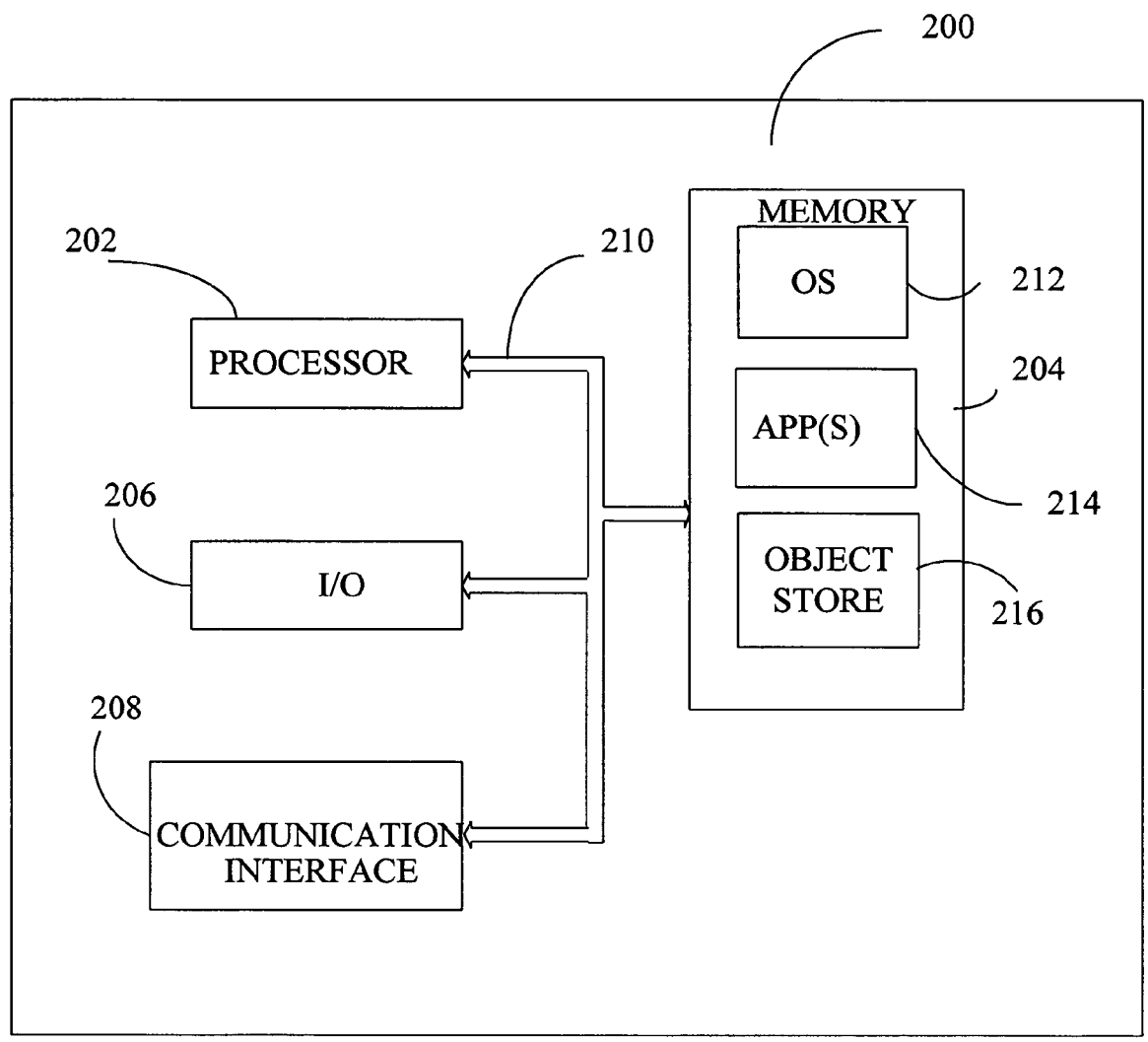
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under the present invention, a system and method are provided that make a decision at each frame of a noisy input signal to identify a noise environment for the frame. The identification of the noise environment can be used for several purposes including setting confidence measure thresholds for accepting a proposed pattern from the recognition system and for reducing noise in the noisy input signal.

A method for training a noise environment identification model is described below with reference to the flow diagram of FIG. 3 and the block diagram of FIG. 4. The method of FIG. 3 also includes steps for generating correction vectors that can be used to remove noise from noisy signals generated in a set of expected noise environments. A method of identifying a noise environment from an input noisy feature vector is described below with reference to the flow diagram of FIG. 5 and the block diagram of FIG. 6.

Figure 3:
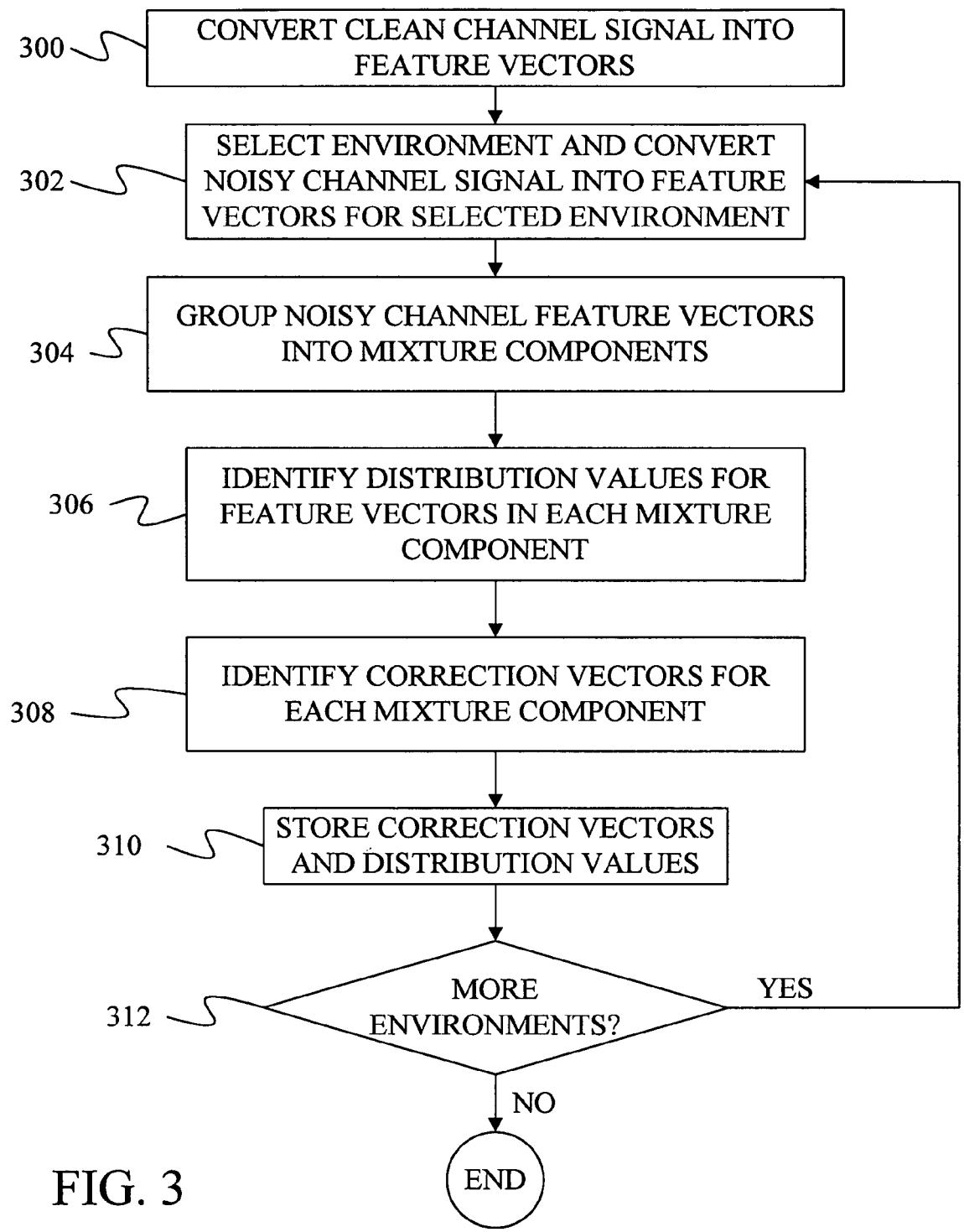
FIG. 3 is a flow diagram of a method of training a noise environment identification system of the present invention.

The method of training a noise environment identification model and of generating correction vectors begins in step 300 of FIG. 3, where a "clean" channel signal is converted into a sequence of feature vectors. To do this, a speaker 400 of FIG. 4, speaks into a microphone 402, which converts the audio waves into electrical signals. The electrical signals are then sampled by an analog-to-digital converter 404 to generate a sequence of digital values, which are grouped into frames of values by a frame constructor 406. In one embodiment, A-to-D converter 404 samples the analog signal at 16 kHz and 16 bits per sample, thereby creating 32 kilobytes of speech data per second and frame constructor 406 creates a new frame every 10 milliseconds that includes 25 milliseconds worth of data.

Each frame of data provided by frame constructor 406 is converted into a feature vector by a feature extractor 408. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

In step 302 of FIG. 3, an expected noise environment is selected and a noisy channel signal from that environment is converted into feature vectors. Although the conversion of step 302 is shown as occurring after the conversion of step 300, any part of the conversion may be performed before, during or after step 300 under the present invention In the embodiment of FIG. 4, the process of step 302 begins when the same speech signal generated by speaker 400 is provided to a second microphone 410. The signal detected by this second microphone includes the speech signal as distorted by a channel associated with the selected noise environment and some amount of additive noise from an additive noise source 412 associated with the selected noise environment. Microphone 410 converts the distorted and/or noisy speech signal into a single electrical signal, which is sampled by an analog-to-digital converter 414. The sampling characteristics for A/D converter 414 are the same as those described above for A/D converter 404. The samples provided by A/D converter 414 are collected into frames by a frame constructor 416, which acts in a manner similar to frame constructor 406. These frames of samples are then converted into feature vectors by a feature extractor 418, which uses the same feature extraction method as feature extractor 408.

In other embodiments, not all of the noisy feature vectors are formed from an actual noisy signal. Instead, a copy of the clean speech signal is modified at some point within the processing chain formed by microphone 402, A/D converter 404, frame constructor 406, and feature extractor 408 to produce synthesized noisy speech.

In one particular embodiment, an average channel distortion vector and an average noise vector are determined for the selected environment based on a relatively small set of clean feature vectors and noisy feature vectors created using the stereo system above. Any of several known techniques for identifying additive noise and channel distortion in a noisy signal can be used to identify these average vectors. A larger set of clean speech vectors are then convolved with the average channel distortion vector and the result is added to the average noise vector to produce a large set of noisy vectors representing a synthesized noisy speech signal.

The ability to synthesize a large amount of noisy data is helpful under the present invention because it allows a large number of environments to be modeled without requiring the recording of a large amount of stereo data from each environment. Those skilled in the art will recognize that the collection of a large amount of stereo data is expensive and that this aspect of the present invention provides a significant cost savings.

Figure 4:
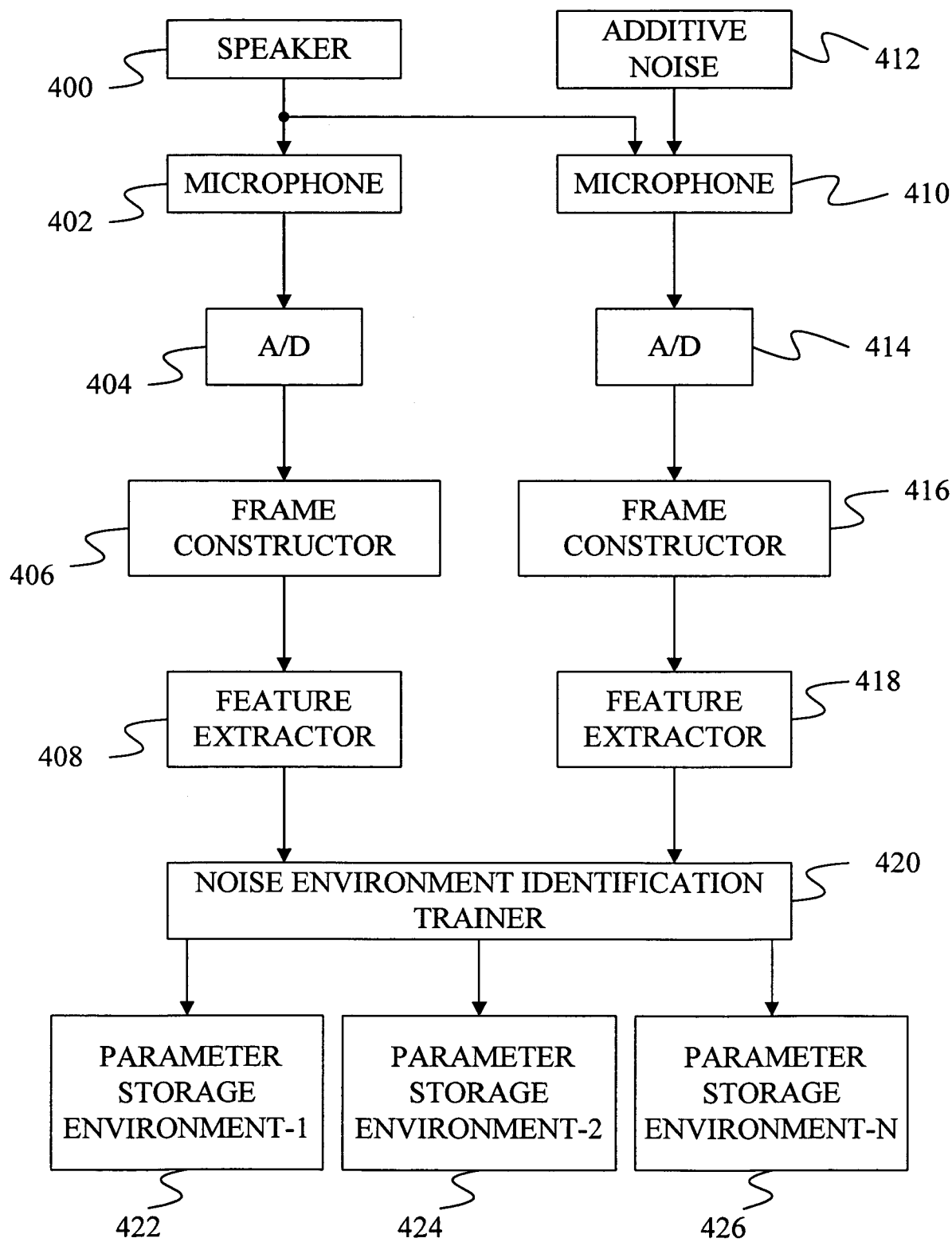
FIG. 4 is a block diagram of components used in one embodiment of the present invention to train a noise environment identification system.

The feature vectors for the noisy channel signal and the "clean" channel signal are provided to a noise environment identification trainer 420 in FIG. 4. At step 304 of FIG. 3, noise environment identification trainer 420 groups the feature vectors for the noisy channel signal into mixture components. This grouping can be done by grouping feature vectors of similar noises together using a maximum likelihood training technique or by grouping feature vectors that represent a temporal section of the speech signal together. Those skilled in the art will recognize that other techniques for grouping the feature vectors may be used and that the two techniques listed above are only provided as examples.

After the feature vectors of the noisy channel signal have been grouped into mixture components, noise environment identification trainer 420 generates a set of distribution values that are indicative of the distribution of the feature vectors within the mixture component. This is shown as step 306 in FIG. 3. In many embodiments, this involves determining a mean vector and a standard deviation vector for each vector component in the feature vectors of each mixture component. In an embodiment in which maximum likelihood training is used to group the feature vectors, the means and standard deviations are provided as by-products of identifying the groups for the mixture components.

Under one embodiment, each mixture component is associated with a codeword (i.e. the mean vector of the mixture component) that provides an approximate and more compact representation of the noisy feature vectors found in the mixture component. By storing a smaller codeword instead of the noisy feature vectors, this embodiment reduces the amount of storage used by the system. In one embodiment, the codeword is based on the mean vector for the mixture component.

For embodiments that use the identified environment to locate correction vectors, the noise environment identification trainer 420 determines a correction vector for each mixture component, at step 308 of FIG. 3. Under one embodiment, the vector components of the correction vector for each mixture component are determined by determining the difference between the average vector of the noisy vectors and the average vectors of the clean vectors for the component.

After a correction vector has been determined for each mixture component at step 308, the correction vectors and distribution values for each mixture component are stored as parameters of the codeword associated with the mixture component at step 310. In FIG. 4, the parameters for the first selected environment are stored in parameter storage 422 of FIG. 4.

At step 312, it is determined whether there are any other noise environments that the model should be trained to identify. If there are additional environments, the process returns to step 302 and a new noise environment is selected. Steps 302, 304, 306, 308, and 310 are then repeated using a noisy channel signal from the newly selected environment. Repeating these steps produces a collection of noise environment identification parameter sets such as sets 422, 424, and 426, with one set for each noise environment. In one embodiment, twenty parameter sets are formed for twenty different noise environments.

Figure 5:
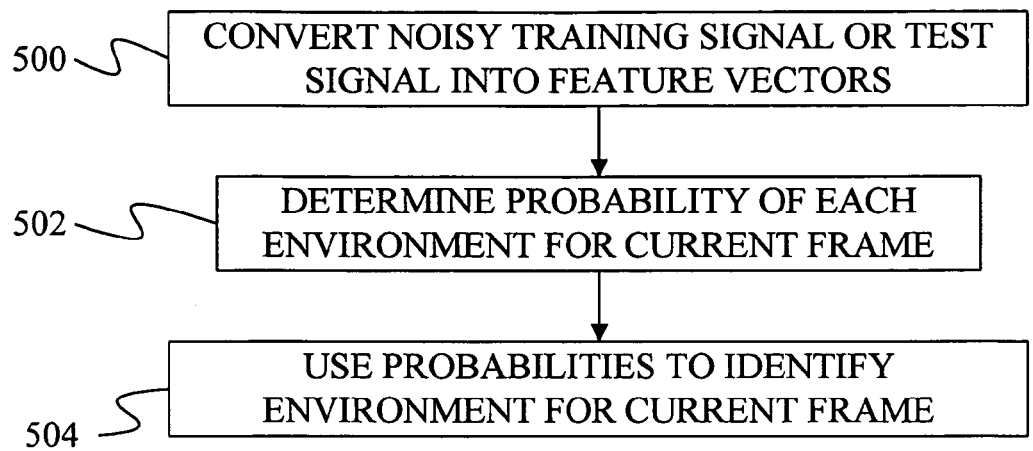
FIG. 5 is a flow diagram of one embodiment of a method of using a noise environment identification system of the present invention.
Figure 6:
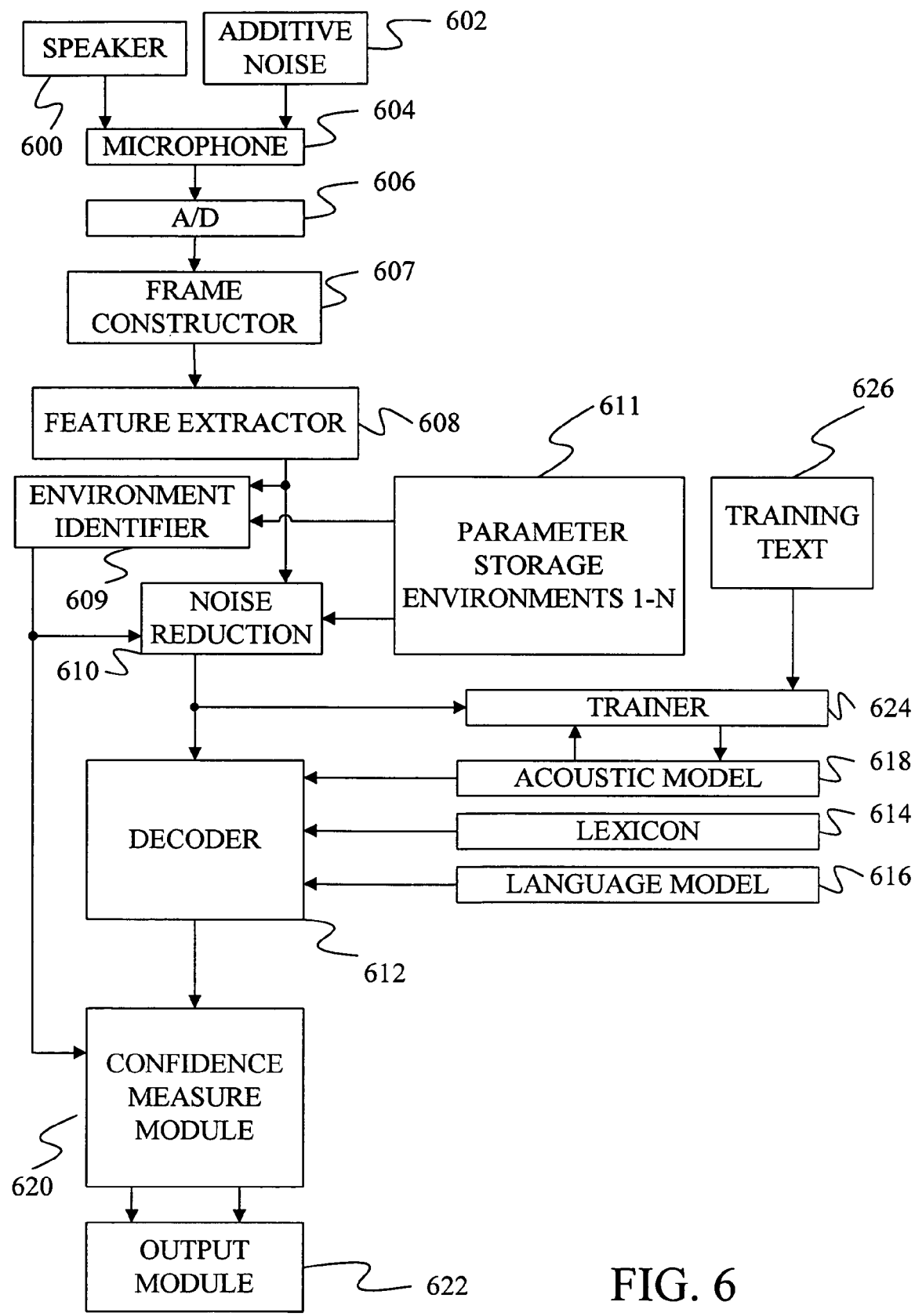
FIG. 6 is a block diagram of a pattern recognition system in which the present invention may be used.

Once the parameters for the mixture components and/or codewords have been formed for each environment, they may be used to identify an environment for a frame of a noisy signal. FIGS. 5 and 6 provide a flow diagram and a block diagram, respectively, that describe a technique and apparatus for identifying a noise environment and for using that identification in a speech recognition system.

The process of FIG. 5 begins at step 500 where a noisy training signal or test signal is converted into a series of feature vectors. In FIG. 6, step 500 involves a speaker 600, either a trainer or a user, speaking into a microphone 604. Microphone 604 also receives additive noise from one or more noise sources 602 in one or more noise environments. The audio signals detected by microphone 604 are converted into electrical signals that are provided to analog-to-digital converter 606. Although additive noise 602 is shown entering through microphone 604 in the embodiment of FIG. 6, in other embodiments, additive noise 602 may be added to the input speech signal as a digital signal after A-to-D converter 606.

A-to-D converter 606 converts the analog signal from microphone 604 into a series of digital values. In several embodiments, A-to-D converter 606 samples the analog signal at 16 kHz and 16 bits per sample, thereby creating 32 kilobytes of speech data per second. These digital values are provided to a frame constructor 607, which, in one embodiment, groups the values into 25 millisecond frames that start 10 milliseconds apart.

The frames of data created by frame constructor 607 are provided to feature extractor 610, which extracts a feature from each frame. The same feature extraction that was used to train the noise environment parameters (the correction vectors, means, and standard deviations of the mixture components) is used in feature extractor 610. As mentioned above, examples of such feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction.

The feature extraction module produces a stream of feature vectors that are each associated with a frame of the speech signal. This stream of feature vectors is provided to an environment identification unit 609, which identifies a noise environment for each feature vector by making a separate environment decision at each frame.

At step 502, environment identification unit 609 determines a set of probabilities that describe the probability that the noise in a noisy feature vector was generated in a particular environment. In particular, environment identification unit 609 determines a separate set of probabilities for each feature vector it receives.

Under one embodiment, the probability of an environment given a noisy feature vector, $P(E|A)$, is determined by first using Bayes rule:

$$P(E \mid A) = P(A \mid E) \frac{P(E)}{P(A)} \qquad \text{EQ. 1}$$

where $P(E|A)$ is the probability of a noise environment E given a noisy signal A, $P(A|E)$ is the probability of noisy signal A given environment E, $P(E)$ is the prior probability of environment E, and $P(A)$ is the prior probability of noisy signal A.

In Equation 1, $P(A)$ is independent of the environment and therefore can be ignored. $P(E)$ may also be ignored because its affects on the total probability is small compared to the $P(A|E)$ term if a sufficient number of frames are used when determining $P(A|E)$.

Thus, the maximum likelihood estimate of the environment can be determined as:

$$\hat{E} = \arg\max_E P(A|E) \qquad \text{EQ. 2}$$

which means that the most likely environment is the environment that has the highest probability of producing the noisy signal.

Under one embodiment, the probability $P(A|E)$ is determined for each noisy vector based on a mixture of Gaussians formed from the mixture components of each environment. In terms of an equation:

$$P(A \mid E) = \frac{1}{\sqrt{2\pi}} \sum_i \exp\left(-\frac{1}{2} d(y, c_i^E)\right) P(c_i^E) \qquad \text{EQ. 3}$$

where $d(y, c_i^E)$ is a distance measure between noisy feature vector y and codeword c for mixture component i of environment E. For a Gaussian distribution, this distance measure is of the form:

$$(y - c_i^E)^T \sum_i^{-1} (y - c_i^E) \qquad \text{EQ. 4}$$

where $$\sum_i^{-1}$$

is the variance of the training noisy feature vectors associated with mixture component i.

Further simplifications can be made by assuming a uniform prior of codewords so $P(c_i^E)$ can be ignored. In a further simplification, it is assumed that $P(A|E)$ is dominated by the closest codeword so that:

$$\hat{P}(A \mid E) = \frac{1}{\sqrt{2\pi}} \exp\left(-\frac{1}{2} \min_i d(y, c_i^E)\right) \qquad \text{EQ. 5}$$

To determine the probability in equation 5, one embodiment of the present invention uses a tree-based vector quantization technique so that the distance between the noisy feature vector and each codeword in an environment does not have to be determined. Instead, the codeword space is sequentially divided into a set of sub-spaces by a set of boundaries until one codeword is in each sub-space. The noisy feature vector is then compared sequentially to boundaries in the set of boundaries until it is placed in a sub-space that is not further divided by a boundary. It is then compared to the codeword in that sub-space to determine the probability of equation 5.

At step 504, the probabilities determined for each environment are used to identify an environment for the current frame. Under one embodiment, the environment is identified simply by selecting the environment that provides the highest probability for the current frame using equation 5. In other embodiments, the observation that the environment is usually stable is used to apply a time filter to the probabilities before selecting a most probable environment. Under one embodiment, the filter is a Finite Impulse Response (FIR) filter of the form:

$$P_n^{FIR}(A \mid E) = \sum_{m=0}^{M-1} h[m] P_{n-m}(A \mid E) \qquad \text{EQ. 6}$$

where $$P_n^{FIR}(A \mid E)$$

is a filtered probability of noisy signal A given environment E for current frame n, $P_{n-m}(A|E)$ is an unfiltered probability for a frame that is m frames before current frame n, $h[m]$ is a weight for a frame that is m frames before current frame n, and M is the number of past frames applied to the filter.

Figure 7:
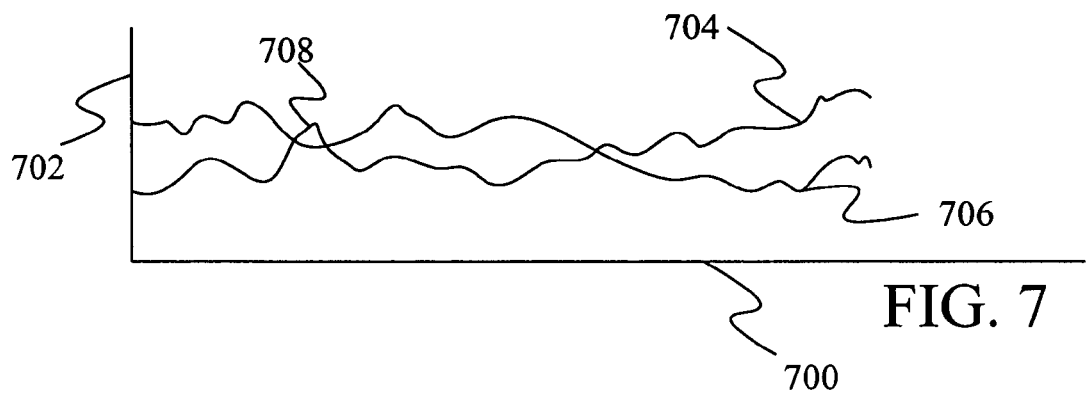
FIG. 7 is a graph of probabilities for two candidate noise environments over a set of frames.
Figure 8:
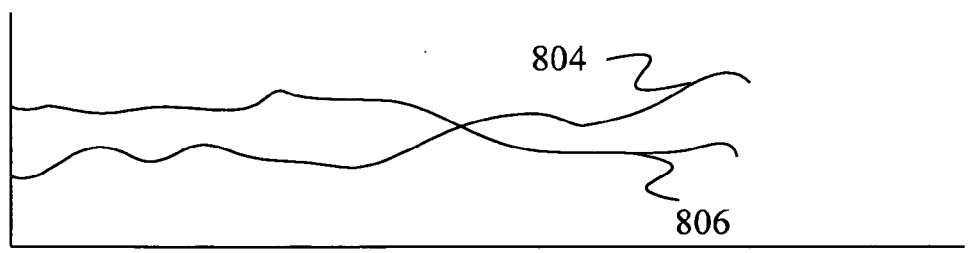
FIG. 8 is a graph of the probabilities of FIG. 7 filtered with an F.I.R. filter.

The effects of filtering can be seen in FIGS. 7 and 8. FIG. 7 shows the value of the calculated probabilities without filtering for a set of frames. In particular, FIG. 7 shows probability graphs 704 and 706 for two different environments with frame numbers shown along horizontal axis 700 and probability shown along vertical axis 702. FIG. 8 shows the calculated probabilities of FIG. 7 after filtering. In particular, graphs 804 and 806 represent filtered versions of graphs 704 and 706, respectively. As can be seen by comparing FIGS. 7 and 8, the filtering removes a spike 708 in graph 704 that would otherwise cause a switch in the identified environment.

Figure 9:
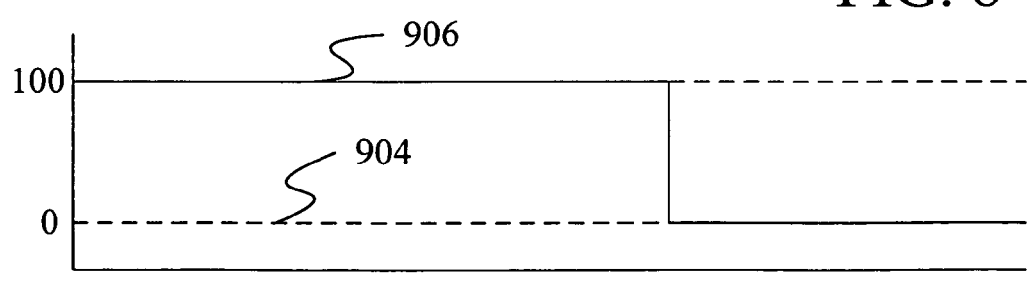
FIG. 9 is a graph showing which environment is selected based on the graphs of FIGS. 7 and 8 using a voting technique.

In other embodiments, a voting filter is used that selects an environment for the current frame based on the number of frames in which each environment was most probable over a set of past frames. The probability used for voting can either be a one-frame probability such as the probability of equation 5 or a filtered probability such as the probability of equation 6. The operation of this voting filter can be seen in FIG. 9 where dotted graph 904 corresponds to probability graph 704 and graph 906 corresponds to probability graph 706.

Once an environment has been selected for a frame, the selected environment can be used during the training and/or use of a pattern recognition system. Under one embodiment, shown in FIG. 6, the selected environment is used to create a clean input feature vector from the noisy input feature. Under this embodiment, the identified environment and the noisy feature vector are provided to a noise reduction module 610, which selects and applies a correction vector to the noisy input feature vector. In particular, noise reduction module 610 accesses stored parameters for the identified environment from environment parameter storage 611, which contains the parameters for all of the expected environments. Typically, noise reduction module 610 selects a correction vector that is associated with the closest codeword to the noisy input feature vector in the identified environment. By applying the selected correction vector to the noisy input feature vector, noise reduction module 610 generates a clean feature vector that can be used to train a recognition model or can be applied to a recognition model to identify a speech unit.

Thus, the output of noise reduction module 610 is a series of clean feature vectors. If the input signal is a training signal, this series of clean feature vectors is provided to a trainer 624, which uses the clean feature vectors and a training text 626 to train an acoustic model 618. Techniques for training such models are known in the art and a description of them is not required for an understanding of the present invention.

If the input signal is a test signal, the clean feature vectors are provided to a decoder 612, which identifies a most likely sequence of words based on the stream of feature vectors, a lexicon 614, a language model 616, and the acoustic model 618. The particular method used for decoding is not important to the present invention and any of several known methods for decoding may be used.

The most probable sequence of hypothesis words is provided to a confidence measure module 620. Confidence measure module 620 identifies which words are most likely to have been improperly identified by the speech recognizer, based in part on a secondary acoustic model (not shown). Confidence measure module 620 then provides the sequence of hypothesis words to an output module 622 along with identifiers indicating which words may have been improperly identified.

In some embodiments, the environment identified by environment identifier 609 is used by confidence measure module 620 when determining the confidence of a hypothesis. Using this information, confidence measure module 620 adjusts the confidence measure based on which environment the hypothesis was generated from. In particular, the confidence measure is changed based on the ability of decoder 612 to identify words spoken in particular environments. If the decoder performs well in an environment, the confidence measure will be higher for that environment. If the decoder performs poorly in an environment, the confidence measure will be lower for words identified from that environment.

Although FIG. 6 depicts a speech recognition system, the present invention may be used in any pattern recognition system and is not limited to speech.

Although the present invention has been described with reference to particular embodiments, workers skilled in the art will recognize that changes may be made in form and detail without departing from the spirit and scope of the invention.

What is claimed is:

1. A method of identifying a clean feature vector representing a clean input signal from a noisy input feature vector representing a noisy input signal formed in a noise environment, the method comprising:
   identifying a noise environment in which the noisy input signal was generated based on the noisy input feature vector and a collection of noise environment identification parameter sets, each parameter set being formed from a different set of feature vectors before receiving the noisy input feature vector and each set being associated with a separate noise environment;
   identifying a correction vector based in part on the identified environment; and
   applying the correction vector to the noisy input feature vector to produce the clean feature vector representing the clean input signal.

2. The method of claim 1 wherein identifying a correction vector comprises:
   determining which of a set of codewords associated with the identified environment is closest to the noisy input feature vector; and
   selecting a correction vector associated with the closest codeword.

3. The method of claim 1 wherein identifying a noise environment comprises determining a separate sum for each environment.

4. The method of claim 3 wherein a parameter set comprises a set of mixture components and wherein determining a sum for an environment comprises taking a sum over a set of mixture components for the environment.

5. The method of claim 4 wherein each mixture component is associated with a codeword.

6. The method of claim 5 identifying a correction vector comprises:
   determining which codeword associated with the identified environment is closest to the noisy input feature vector; and
   selecting a correction vector associated with the closest codeword.

7. A computer-readable medium having computer-executable instructions for identifying a clean feature vector through steps comprising:
   identifying a noisy feature vector for a section of an utterance;
   determining the noise environment for the section based on the noisy feature vector and a collection of parameter sets, wherein a separate parameter set is trained for each noise environment before receiving the section of the utterance;
   identifying a correction vector based on the noise environment determined for the section; and
   applying the correction vector to the noisy feature vector to form a clean feature vector representing a clean utterance.

8. The computer-readable medium of claim 7 wherein:
   a parameter set for a noise environment is trained by grouping a collection of noisy training feature vectors associated with an environment into mixture components; and
   wherein determining a noise environment comprises determining a probability of the environment by taking a sum over all of the mixture components.

9. The computer-readable medium of claim 8 wherein making a determination of a noise environment comprises determining a probability for each possible environment.

10. The computer-readable medium of claim 9 wherein making a determination of a noise environment comprises selecting the noise environment with the highest probability.

11. The computer-readable medium of claim 10 wherein identifying a correction vector comprises:
   identifying which codeword from a set of codewords that is associated with the selected environment is closest to the noisy feature vector for the section; and
   selecting a correction vector associated with the closest codeword.

12. The computer-readable medium of claim 11 wherein the clean feature vector is used to train a model.

13. The computer-readable medium of claim 11 wherein the clean feature vector is applied to a model to identify a speech unit.

14. A method of identifying a noise environment in which a noisy input signal was generated, the method comprising:
   identifying frames of the noisy input signal;
   generating a noisy input feature vector for the signal in each frame; and
   for each frame, making a separate identification of a noise environment in which the noisy input feature vector for the current frame was generated by determining a probability for a noise environment by applying the noisy input feature vector to a distribution of noisy training feature vectors wherein the noisy training feature vectors are formed by modifying a set of clean training feature vectors.

15. The method of claim 14 wherein modifying clean training feature vectors comprises:
   convolving the clean training feature vectors with a set of channel distortion feature vectors to produce distorted training feature vectors; and
   adding additive noise feature vectors to the distorted training feature vectors to produce the noisy training feature vectors.

16. The method of claim 14 further comprising identifying a correction vector to apply to the noisy input feature vector to produce a clean feature vector based in part on the identified environment.

17. The method of claim 16 wherein identifying a correction vector comprises:
   determining which of a set of codewords associated with the identified environment is closest to the noisy input feature vector; and
   selecting a correction vector associated with the closest codeword.

18. The method of claim 17 wherein determining which of a set of codewords associated with the identified environment is closest comprises:
   dividing a feature vector space associated with the environment into sub-spaces by sequentially dividing the feature vector space using a set of boundary conditions; and
   comparing the noisy input feature vectors with at least one of the boundary conditions to identify the closest codeword in the environment.

19. The method of claim 14 further comprising creating a separate set of noisy training features vectors for each noise environment by modifying a set of clean training feature vectors.

20. The method of claim 19 further comprising creating a separate distribution for each set of noisy training feature vectors.

21. A computer-readable medium having computer-executable instructions for identifying a noise environment from sections of a noisy speech signal that are smaller than an utterance through steps comprising:
   identifying at least one feature of each section; and
   making a separate determination of the noise environment for each section based on the at least one feature by determining a probability for a noise environment using a distribution of noisy training feature vectors associated with the environment, wherein the noisy training feature vectors are formed by modifying clean training feature vectors.

22. The computer-readable medium of claim 21 wherein modifying clean training feature vectors comprises:
   applying a channel distortion function to the clean training feature vectors to form distorted feature vectors; and
   adding noise feature vectors to the distorted feature vectors to produce the noisy training feature vectors.

23. A method of identifying a noise environment in which a noisy speech signal is generated, the method comprising:
   creating a first set of noisy feature vectors for a first noise environment by modifying each clean feature vector in a set of clean feature vectors;
   identifying a first set of distribution parameters for the first set of noisy feature vectors;
   creating a second set of noisy feature vectors for a second noise environment by modifying each clean feature vector in the set of clean feature vectors;
   identifying a second set of distribution parameters for the second set of noisy feature vectors; and
   determining a probability of the first noise environment using the first set of distribution parameters and determining a probability of the second noise environment using the second set of distribution parameters and using the probability of the first noise environment and the probability of the second noise environment to identify a noise environment for the noisy speech signal.

24. The method of claim 23 wherein identifying a first set of distribution parameters comprises grouping sub-sets of the first set of noisy feature vectors into mixture components and identifying a distribution parameter for each mixture component.

25. The method of claim 24 wherein identifying a second set of distribution parameters comprises grouping sub-sets of the second set of noisy feature vectors into mixture components and identifying a distribution parameter for each mixture component.

26. The method of claim 25 wherein using the first and second set of parameters to identify a noise environment for the noisy speech signal comprises:
   identifying a noisy feature vector from the noisy speech signal;
   identifying a single mixture component from the mixture components for the first set of noisy feature vectors using the noisy feature vector; and
   wherein determining the probability of the first noise environment comprises determining a probability using a distribution parameter associated with the identified mixture component.

27. The method of claim 26 wherein using the first and second set of parameters to identify a noise environment for the noisy speech signal further comprises:
   identifying a single mixture component from the mixture components for the second set of noisy feature vectors using the noisy feature vector; and
   wherein determining the probability of the second environment comprises determining a second probability using a distribution parameter associated with the identified mixture component for the second set of noisy feature vectors.

28. The method of claim 27 wherein using the probability and the second probability to identify a noise environment comprises selecting the noise environment with the highest probability.

29. A method of identifying a noise environment in which a noisy input signal was generated, the method comprising:
 identifying frames of the noisy input signal;
 generating a noisy input feature vector for the signal in each frame; and
 for each frame, making a separate identification of a noise environment in which the noisy input feature vector for the current frame was generated based on the noisy input feature vector by determining a filtered probability of an environment for a current frame based in part on the probability of the environment for at least one previous frame.

30. The method of claim 29 wherein determining the filtered probability of an environment for a current frame comprises:
 determining an unfiltered probability of the environment based on the current noisy input feature vector;
 determining the probability of the environment based on at least one previous noisy input feature vector;
 applying weights to the probabilities to form weighted probabilities; and
 combining the weighted probabilities to determine the filtered probability of the environment for the current frame.

31. The method of claim 30 wherein identifying a noise environment further comprises comparing the probability of each environment for the current frame and selecting the most probable environment as the identified noise environment.

32. The method of claim 30 wherein identifying a noise environment further comprises:
 for each noise environment, counting the number of frames in a set of previous frames in which the noise environment had the highest filtered probability; and
 selecting the noise environment with the highest count as the identified noise environment for the current frame.

33. The method of claim 29 wherein identifying a noise environment further comprises:
 for each noise environment, counting the number of frames in a set of previous frames in which the noise environment was the most probable noise environment; and
 selecting the noise environment with the highest count as the identified noise environment for the current frame.

34. The method of claim 29 further comprising identifying a correction vector to apply to the noisy input feature vector to produce a clean feature vector based in part on the identified environment.

35. The method of claim 34 wherein identifying a correction vector comprises:
 determining which of a set of codewords associated with the identified environment is closest to the noisy input feature vector; and
 selecting a correction vector associated with the closest codeword.

36. The method of claim 35 wherein determining which of a set of codewords associated with the identified environment is closest comprises:
 dividing a feature vector space associated with the environment into sub-spaces by sequentially dividing the feature vector space using a set of boundary conditions; and
 comparing the noisy input feature vectors with at least one of the boundary conditions to identify the closest codeword in the environment.

37. A computer-readable medium having computer-executable instructions for identifying a noise environment from sections of a noisy speech signal that are smaller than an utterance through steps comprising:
 identifying at least one feature of each section; and
 making a separate determination of the noise environment for each section based on the at least one feature by determining a filtered probability for each section, each filtered probability based on the probability of the noise environment for multiple sections.

38. The computer-readable medium of claim 37 wherein determining a filtered probability comprises:
 determining a probability of the environment for a current section;
 determining the probability of the environment for a past section;
 weighting the probability for the current section to form a weighted current probability;
 weighting the probability for the past section to form a weighted past probability; and
 combining the weighted current probability and the weighted past probability to form the filtered probability.

39. The computer-readable medium of claim 38 wherein making a separate determination of the noise environment comprises:
 for each environment, counting the number of past sections in which the environment had the highest filtered probability; and
 determining that the noise environment with the highest count is the noise environment of the current section.

40. A computer-readable medium having computer-executable instructions for identifying a noise environment from sections of a noisy speech signal that are smaller than an utterance through steps comprising:
 identifying at least one feature of each section; and
 making a separate determination of the noise environment for each section based on the at least one feature through steps comprising:
  determining a probability for each environment for each of a set of sections;
  for each environment, counting the number of sections in the set of sections in which the environment had the highest probability; and
  determining that the noise environment with the highest count is the noise environment of a current section.

41. The computer-readable medium of claim 40 wherein determining a probability comprises determining a distribution of noisy training feature vectors associated with an environment.

42. The computer-readable medium of claim 41 wherein the noisy training feature vectors are formed by modifying clean training feature vectors.

43. The computer-readable medium of claim 42 wherein modifying clean training feature vectors comprises:
 applying a channel distortion function to the clean training feature vectors to form distorted feature vectors; and
 adding noise feature vectors to the distorted feature vectors to produce the noisy training feature vectors.

* * * * *